Figure 1:
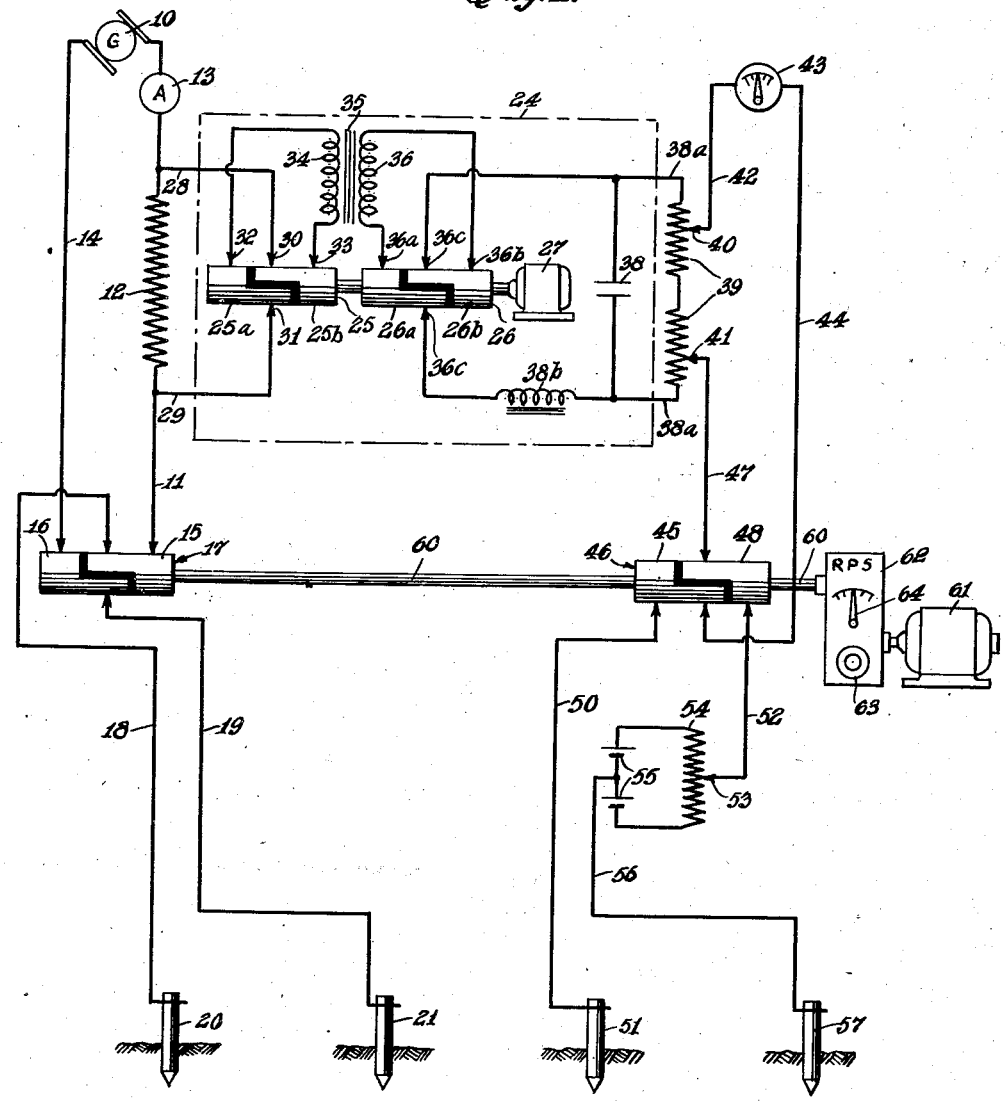

Feb. 29, 1944.  H. M. EVJEN  2,343,140
APPARATUS FOR MAKING GEOPHYSICAL EXPLORATIONS
Filed Jan. 8, 1942  2 Sheets-Sheet 1

INVENTOR.
HAAKON M. EVJEN
BY
ATTORNEY.

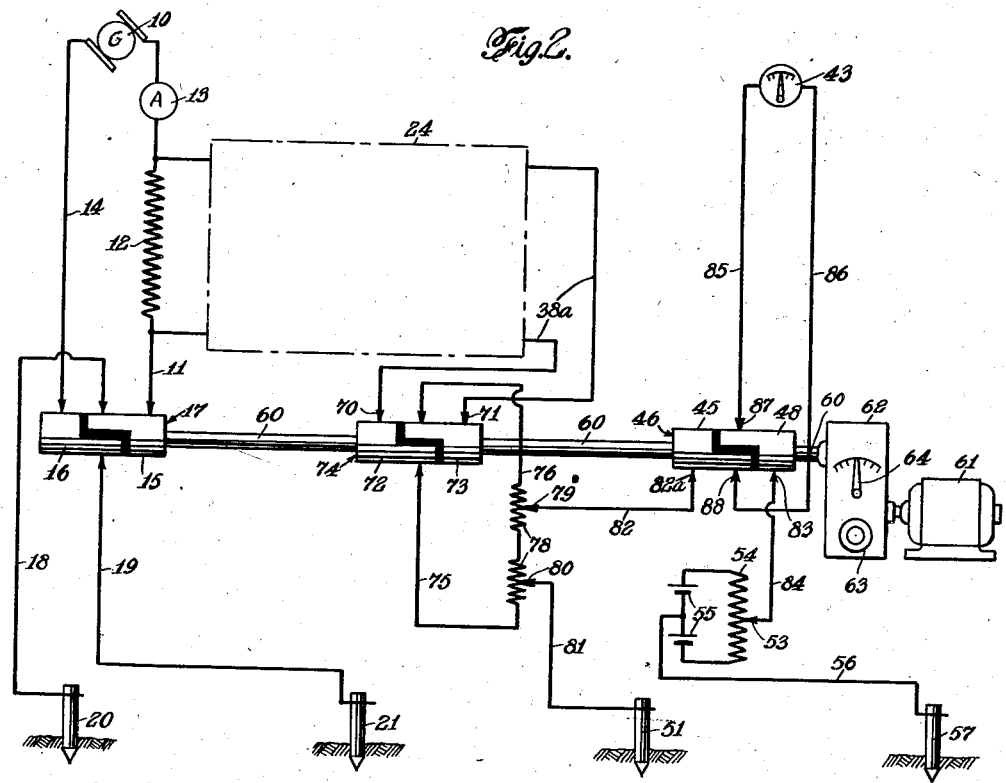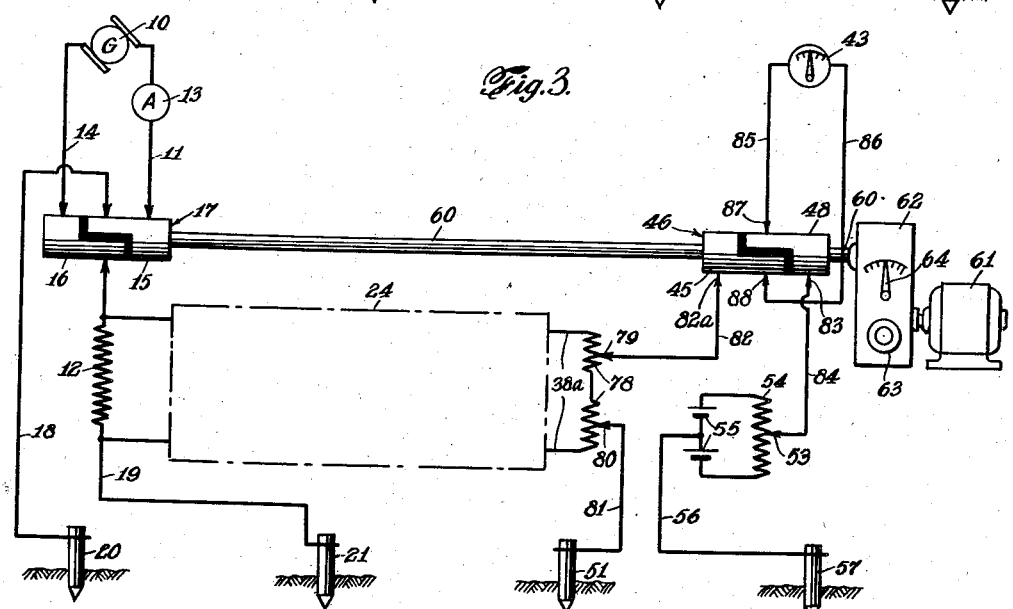

Patented Feb. 29, 1944

2,343,140

UNITED STATES PATENT OFFICE 2,343,140

APPARATUS FOR MAKING GEOPHYSICAL EXPLORATIONS

Haakon M. Evjen, Houston, Tex., assignor to Nordel Corporation, Houston, Tex., a corporation of Delaware Application January 8, 1942, Serial No. 425,992

3 Claims. (Cl. 175—182)

This invention relates to a method of electrical prospecting and to an apparatus for carrying out the same and is an improvement on the system disclosed in a patent to Knute Evjen No. 2,294,395, dated Sept. 1, 1942, which embodies an earth current circuit including a current source and a controlled reversing means for passing a current reversed at a predetermined controlled low frequency through the earth between spaced earth electrodes, and a potential circuit including potential pick-up electrodes located at spaced points adjacent the earth's surface and lying within the field of influence of the earth current. The potential circuit is provided with reversing means synchronized with the first reversing means for converting the picked-up potential into a uni-directional potential suitable for actuating a direct current measuring instrument such as a galvanometer. The earth current circuit and the potential circuit are coupled by a coupling circuit which includes means for producing a potential drop proportional to the total current flowing in the earth current circuit and for balancing a controllable portion of this potential drop against the picked-up potential so as to obtain, by a single reading, a measurement which indicates directly the earth's apparent resistivity.

An object of this invention is to provide a novel and improved system of the type above indicated.

Another object is to provide a novel and improved coupling circuit in a system of the above type.

Various other objects and advantages will be apparent as the nature of the invention is more fully disclosed.

Although the novel features which are believed to be characteristic of this invention are more particularly pointed out in the claims appended hereto, the invention itself may be better understood by referring to the following description, taken in connection with the accompanying drawings, in which certain specific embodiments thereof have been set forth for purposes of illustration.

In the drawings,

Fig. 1 is a schematic representation of an electrical prospecting system embodying the present invention; and Figs. 2 and 3 are similar schematic representations illustrating different embodiments of the invention.

The present invention provides a novel and improved means for obtaining a measuring potential which bears a definite relationship to the current flowing in the earth circuit and may be compared with the potential impressed between the measuring or potential electrodes by the earth current flow. This is accomplished by utilizing the potential drop in a resistance connected in the earth current circuit to produce a corresponding potential drop in a potentiometer connected in the potential circuit. Reversing means and an intermediate transformer are included in the coupling circuit to avoid a direct metallic connection between the earth current circuit and the potential circuit. The measuring potential is taken from the potentiometer and may be adjusted to exactly counter-balance the potential being measured. A galvanometer or the like may be used for determining when an exact balance is reached.

The only reading which is required in this system is the setting of the potentiometer by which the measuring potential is obtained. This potentiometer may be calibrated in suitable units which correspond to the earth's electrical characteristics and may be interpreted to indicate the variations in the earth's apparent resistivity without further calculations.

One embodiment of this invention is shown more in detail in Fig. 1. Referring to this figure, the earth current circuit comprises a source 10 of direct current, such as a generator or battery. The source 10 is connected in series circuit with a line 11, a resistance 12 of from 1 to 20 ohms, an ammeter 13 and a line 14. Lines 11 and 14 are connected to segments 15 and 16 respectively of a reversing commutator 17 which is driven by suitable means to be described. Alternating current is taken from the commutator 17 by means of lines 18 and 19 respectively which are connected to suitable ground electrodes 20 and 21 herein referred to for convenience as current electrodes. The current electrodes 20 and 21 are spaced a convenient distance apart, which may be of the order of several thousand feet, and when the commutator 17 is driven at a suitable speed, an alternating current having a frequency corresponding to the speed of rotation of the commutator, passes through the earth circuit. This current may be measured by the ammeter 13 and may be adjusted within desired limits by suitable regulation of the source 10.

It will be noted that a potential drop is built up across the resistance 12 which is directly proportional to the current flowing in the earth circuit. This potential drop is utilized in the present system for obtaining the measuring potential.

For this purpose a coupling circuit 24 is provided which comprises a pair of commutators 25 and 26 driven by suitable means shown as a motor 27. The resistance 12 is connected by lines 28 and 29 to reversing contacts 30 and 31 respectively of the commutator 25. Segments 25a and 25b of commutator 25 are connected by brushes 32 and 33 to the primary 34 of a transformer 35. The secondary 36 of the transformer 35 is connected by brushes 36a and 36b to segments 26a and 26b of the commutator 26. Reversing contacts 36c of the commutator 26 are connected by lines 38a across a potentiometer 39 having variable contacts 40 and 41. A condenser 38 may be connected between the lines 38a and a choke coil 38b may be connected in one of the lines 38a to smooth out the ripples.

The contact 40 is connected by a line 42 to a galvanometer 43 and thence through a line 44 to a commutator 46. The contact 41 is connected by a line 47 to said commutator 46. Segment 45 of the commutator 46 is connected by a line 50 to an earth potential electrode 51. Segment 48 of the commutator 46 is connected by a line 52 to the movable contact 53 of a potentiometer 54 which is connected across a battery 55. The midpoint of this battery 55 is connected by a line 56 to an earth potential electrode 57. The commutators 17 and 46 are shown as mounted on a common shaft 60 and as driven in synchronism by a motor 61 through a suitable control box 62 which may comprise a gear box and a rheostat for adjusting the motor speed. A control handle 63 is provided for controlling the motor speed as desired. The speed of rotation of the commutator may be indicated by a speed indicator 64.

The galvanometer 43 is preferably of the highly damped type so that it is influenced only by the direct current component and not by any ripple or other alternating current component in the circuit under measurement.

Operation

In the operation of this system, the current electrodes 20 and 21 are located at selected points in the earth and the potential electrodes 51 and 57 are located at points within the field of influence of the earth currents produced between the current electrodes. The source 10 is adjusted to pass a predetermined amount of current through the earth circuit, as indicated by the ammeter 13. The frequency of alternation of the current is regulated by making suitable adjustment of the control handle 63. If the measurements are to be taken with direct current, the commutator 17 remains stationary. For low frequency alternating current, the commutator is slowly rotated at the selected speeds as indicated by the speed indicator 64. It will be noted that the potential drop in the resistance 12 will vary in proportion to the amount of current flowing in the earth circuit.

The potential drop across the resistance 12 is reversed by the commutator 25 at a frequency determined by the speed of rotation thereof and is applied to the primary of the transformer 35. The current flowing in the secondary 36 of the transformer 35 is rectified by means of the commutator 26 so as to produce in the lines 38a a direct current which bears a definite relationship to the current flowing in the earth current circuit. This current produces in the potentiometer 39 a potential drop which is proportional to the potential drop in the resistance 12 and hence to the earth current. The potential drop in the potentiometer 39 is applied to the potential circuit in a direction to oppose the picked-up potential.

With the circuit operating in this manner, suitable adjustments are made of the contacts 40 and 41 to produce a zero reading on the galvanometer 43 which indicates that the average voltage drop across the intermediate portion of the potentiometer 39 between the contacts 40 and 41 exactly balances the potential which is picked up by the earth potential electrodes 51 and 57 after the latter has been rectified by commutator 46.

The potential picked up by the potential electrodes corresponds in frequency to the frequency of the earth current. The alternating potential is rectified by the commutator 46 which operates in synchronism with earth current commutator 17 to supply a direct voltage across the galvanometer 43 and to the potentiometer 39.

The effect of any residual earth current which would tend to produce a constant direct potential across the electrodes 51 and 57 is eliminated by suitable adjustment of the potentiometer 54. This adjustment may be made, for example, while no current is flowing through the earth circuit so that the only effect on the galvanometer 43 represents the effect of the residual earth current. Since the earth current impresses a direct current potential across the probe (or potential) electrodes, any unbalance between this potential and the potential taken from potentiometer 54, will appear as an alternating potential after commutation by commutator 46. This will make the galvanometer kick from one side to the other in synchronism with the commutation. Any drift in the natural earth potential may thus be immediately perceived, and can be compensated by readjusting potentiometer 54 until the kicking of the galvanometer is eliminated.

The potentiometer 39 may be suitably graduated in convenient units and when the balance is obtained, the reading corresponding to the point of adjustment is noted. The frequency is also noted from the indicator 64. The potential developed across the potentiometer 39, being dependent upon the total value of the earth current at the instant that the measurement is being taken, automatically compensates for any variations in electrode resistance or in contact resistance and eliminates any necessity for making simultaneous measurements of the earth current and the induced potential.

This measurement is repeated with different frequencies until a complete potential spectrum of the area between electrodes 51 and 57 is obtained. These electrodes may then be moved to another location and the measurement repeated to obtain a potential spectrum at various frequencies in the manner above pointed out. The various spectra thus obtained my be interpreted to show the characteristics of the earth's strata in the area under investigation. It is to be understood, of course, that the potential electrodes may be variously positioned with respect to the current electrodes 20 and 21 and that the positions thereof may be changed in accordance with the depth which is under investigation at any particular instant.

It will be noted that in the above described system only a single reading need be taken and the necessity for mathematical calculations is avoided. The system is accordingly well adapted to field use and may be operated by unskilled persons. The data thus compiled may be interpreted by geological physicists in accordance with well known principles.

The size of the electrodes may vary over wide limits. In practice, metal stakes about one or two inches in diameter and 3 ft. or 4 ft. in length have been found satisfactory. The distance between the current electrodes may vary widely, for example, from 200 ft. to 5000 ft., depending upon the depth to be investigated. The potential of the source 10 may likewise be adjusted as desired. Voltages of 100 volts to 200 volts and earth currents of one to two amperes have been found satisfactory.

In the embodiment shown in Fig. 2 parts corresponding to Fig. 1 are given the same reference numbers. The coupling circuit indicated by the rectangle 24 is identical with the coupling circuit included in the rectangle 24 of Fig. 1. It is to be noted that the measuring voltage is taken from the direct current side of the current commutator 17 as in Fig. 1, but is applied in Fig. 2 to the alternating current side of the commutator 46.

In Fig. 2 the segment 48 of the commutator 46 is connected by a brush 83 and lead 84 to the contact 53 of the potentiometer 54. The galvanometer 43 is connected by leads 85 and 86 and brushes 87 and 88 to the commutator 46. The lines 38a are connected by brushes 70 and 71 to segments 72 and 73 respectively of a commutator 74 which is mounted on the shaft 60 and is driven in synchronism with the commutators 17 and 46. The commutator 74 is connected by lines 75 and 76 across a potentiometer 78 having variable contacts 79 and 80. The contact 79 is connected by a line 82 and brush 82a to the segment 45 of the commutator 46. The contact 80 is connected by a line 81 to the potential electrode 51. The remaining elements are identical with those shown and described in Fig. 1.

In this embodiment the measuring potential derived from the lines 38a is reversed by means of commutator 4 in synchronism with the reversals of the earth current and is applied to the potential circuit on the alternating current side of the commutator 46. The potential derived from the potential electrodes 51 and 57 is balanced against the potential taken from the potentiometer 78, is rectified by the commutator 46 and is applied as a direct current to the galvanometer 43. The operation is otherwise identical with the system shown in Fig. 1.

In the embodiment shown in Fig. 3 the various parts are similar to Fig. 1 and given corresponding reference characters. In this embodiment, however, the coupling circuit indicated by the rectangle 24 is connected between the alternating current sides of the commutators 17 and 46. In this embodiment the ammeter 13 is connected by the lead 11 directly to segment 15 of the commutator 17. The resistance 12 is connected in the lead 19. The potentiometer 78 is connected as shown in Fig. 2 to the leads 81 and 82 between the commutator 46 and the potential electrode 51. The other elements are connected as previously described and operate in a similar manner.

It is to be understood that the commutators 17, 46 and 74 are shown as rotary commutators merely for purposes of illustration and that any suitable synchronized reversing means may be used for reversing the current in the respective circuits so as to obtain the balancing and measuring effect above described. Furthermore, any suitable means may be used for controlling the rate of operation of such commutators for thereby varying the frequency of the measuring current so as to obtain the desired frequency spectrum of the various localities under measurement.

Although certain specific embodiments of the invention have been shown for purposes of illustration, it is to be understood that the invention is not to be limited thereto but that various changes and modifications may be made therein as will readily appear to a person skilled in the art. The invention is only to be limited in accordance with the scope of the following claims.

What is claimed is:

1. A system for electrical prospecting, comprising an earth current circuit including a source of direct current, a pair of spaced earth electrodes, a motor driven mechanical reversing switch connected between said source and said electrodes for reversing the direct current at a predetermined controlled frequency whereby an earth current having a predetermined frequency is passed through the earth between said electrodes, a potential circuit including potential pick-up electrodes located at spaced points lying within the field of influence of said earth current, a direct current indicating device connected to indicate the potential of said potential circuit, a second motor driven mechanical reversing switch synchronized with said first reversing switch and connected between said potential pick-up electrodes and said indicating device to convert the picked-up potential difference into a unidirectional potential suited to actuate said indicating device, a coupling circuit connected between said earth current circuit and said potential circuit to impress on said potential circuit a balancing potential which is directly proportional to the current flowing in said earth current circuit at the instant of measurement, said coupling circuit comprising a resistance connected in series with said earth current circuit to develop a potential drop thereacross proportional to the current flowing in said earth current circuit, a second resistance connected in said potential circuit, a transformer having a primary connected across said first resistance and a secondary connected across said second resistance, a third motor driven mechanical reversing switch connected between said first resistance and said primary for periodically reversing the flux induced by said primary and thereby inducing an alternating potential in said secondary, and a fourth motor driven mechanical reversing switch operating in synchronism with said third reversing switch and connected between said secondary and said second resistance for rectifying the secondary potential and connected to supply a uni-directional current to said second resistance to develop a potential drop therein opposing the picked-up potential and bearing a definite relationship to the earth current at all times.

2. A system for electrical prospecting, comprising an earth current circuit including a source of direct current, a pair of spaced earth electrodes, a motor driven mechanical reversing switch connected between said source and said electrodes for reversing the direct current at a predetermined controlled frequency whereby an earth current having a predetermined frequency is passed through the earth between said electrodes, a potential circuit including potential pick-up electrodes located at spaced points lying within the field of influence of said earth current, a direct current indicating device connected to indicate the potential of said potential circuit, a second motor driven mechanical reversing switch synchronized with said first reversing switch and connected between said potential pick-up electrodes and said indicating device to convert the picked-up potential difference into a unidirectional potential suited to actuate said indicating device, a coupling circuit connected between said earth current circuit and said potential circuit to impress on said potential circuit a balancing potential which is directly proportional to the current flowing in said earth current circuit at the instant of measurement, said coupling circuit comprising a resistance connected in series with said earth current circuit to develop a potential drop thereacross proportional to the current flowing in said earth current circuit, a second resistance connected in said potential circuit, a transformer having a primary connected across said first resistance and a secondary connected across said second resistance, a third motor driven mechanical reversing switch connected between said first resistance and said primary for periodically reversing the flux induced by said primary and thereby inducing an alternating potential in said secondary, and a fourth motor driven mechanical reversing switch operating in synchronism with said third reversing switch and connected between said secondary and said second resistance for rectifying the secondary potential and connected to supply a unidirectional current to said second resistance to develop a potential drop therein opposing the picked-up potential and bearing a definite relationship to the earth current at all times, said first resistance being connected on the alternating current side of the reversing switch of said earth current circuit and said second resistance being connected on the alternating current side of the reversing switch of said potential circuit.

3. A system for electrical prospecting, comprising an earth current circuit including a source of direct current, a pair of spaced earth electrodes, a motor driven mechanical reversing switch connected between said source and said electrodes for reversing the direct current at a predetermined controlled frequency whereby an earth current having a predetermined frequency is passed through the earth between said electrodes, a potential circuit including potential pick-up electrodes located at spaced points lying within the field of influence of said earth current, a direct current indicating device connected to indicate the potential of said potential circuit, a second motor driven mechanical reversing switch synchronized with said first reversing switch and connected between said potential pick-up electrodes and said indicating device to convert the picked-up potential difference into a unidirectional potential suited to actuate said indicating device, a coupling circuit connected between said earth current circuit and said potential circuit to impress on said potential circuit a balancing potential which is directly proportional to the current flowing in said earth current circuit at the instant of measurement, said coupling circuit comprising a resistance connected in series with said earth current circuit to develop a potential drop thereacross proportional to the current flowing in said earth current circuit, a second resistance connected in said potential circuit, a transformer having a primary connected across said first resistance and a secondary connected across said second resistance, a third motor driven mechanical reversing switch connected between said first resistance and said primary for periodically reversing the flux induced by said primary and thereby inducing an alternating potential in said secondary, and a fourth motor driven mechanical reversing switch operating in synchronism with said third reversing switch and connected between said secondary and said second resistance for rectifying the secondary potential and connected to supply a unidirectional current to said second resistance to develop a potential drop therein opposing the picked-up potential and bearing a definite relationship to the earth current at all times, said first resistance being connected on the direct current side of the reversing switch of said earth current circuit, the second resistance being connected on the alternating current side of the reversing switch of said potential circuit, and a fifth motor driven mechanical reversing switch synchronized with said first and second reversing switches connected to reverse the connection from said second resistance to said coupling circuit, whereby the potential drop in said second resistance corresponds in direction to the potential picked-up by said potential pick-up electrodes.

HAAKON M. EVJEN.